United States Patent [19]
Hayashi et al.

[11] 4,248,749
[45] Feb. 3, 1981

[54] STRIPPING-RESISTANT ASPHALT COMPOSITIONS

[75] Inventors: Shigeyuki Hayashi, Kawasaki; Masao Isobe, Kamakura, both of Japan

[73] Assignee: Nippon Oil Co. Ltd., Tokyo, Japan

[21] Appl. No.: 30,785

[22] Filed: Apr. 17, 1979

[51] Int. Cl.$^3$ .............................................. C08L 95/00
[52] U.S. Cl. .............................. 260/28.5 AS; 106/269; 106/281 R
[58] Field of Search .......................... 106/269, 281 R; 260/28.5 AS

[56] References Cited

U.S. PATENT DOCUMENTS

| | | | |
|---|---|---|---|
| 3,967,651 | 7/1976 | Snyder et al. | 260/28.5 AS |
| 3,985,694 | 10/1976 | Petrucco et al. | 260/28.5 AS |
| 4,139,511 | 2/1979 | Hayashi et al. | 260/28.5 AS |

FOREIGN PATENT DOCUMENTS 50-157415  12/1975  Japan.

*Primary Examiner*—Morton Foelak
*Attorney, Agent, or Firm*—Jordan and Hamburg

[57] ABSTRACT

A stripping-resistant asphalt composition comprising (A) an asphaltic material, (B) a reaction product of a maleic compound, such as maleic anhydride, and another organic compound, such as liquid polybutadiene, and (C) aggregate.

1 Claim, No Drawings

STRIPPING-RESISTANT ASPHALT COMPOSITIONS

This invention relates to an excellently stripping-resistant asphalt composition comprising an asphaltic material, a maleinated organic compound and aggregate.

Mixtures or compositions of an asphaltic material and aggregate have heretofore been used in paving roads. In such mixtures, the asphaltic material with which the aggregate is coated will peel off the aggregate under the influence of atmospheric moisture and temperature as well as traffic after the use of the mixtures for a long period of time, this being a cause for destruction of the pavement prepared from the mixtures.

In attempts to overcome the drawback, there has hitherto been proposed a method comprising adding an alkylamine or imidazoline type compound, which is a kind of surface-active agent, as a peeling inhibitor to such an asphalt composition. However, this method has not given fully satisfactory results.

A primary object of this invention is to provide asphalt compositions which are capable of produce a pavement having excellent stripping-resistance and have other properties as required in asphalt compositions for use in pavement. The term "stripping resistance" used herein is intended throughout the specification to mean "resistance to peeling of an asphaltic material from aggregate in a pavement prepared from a composition of the asphaltic material and aggregate".

The composition of this invention for stripping-resistant pavement comprises, by weight, (A) 100 parts of an asphaltic material, (B) 0.1–20 parts of a maleinated organic compound having an average molecular weight of 200–10,000 and an acid value of 10–250 and (C) 500–4000 parts of aggregate.

The maleinated (or maleinised) organic compound is at least one member in maleinated form selected from the group consisting of liquid polybutadienes, petroleum resins, drying oils of vegetable origin and polymers thereof, low molecular weight polymers of $C_2$–$C_{15}$ straight-chain monoolefins, and petroleum-derived waxes.

Japanese Patent Application Laying-Open Gazette of 157415/75 discloses a composition comprising bitumen containing carboxylic acid groups, carboxylic anhydride groups and/or groups derived therefrom as well as polymers (or copolymers) containing such groups as above. More particularly, said Gazette discloses that a maleic anhydride-modified bitumen is mixed with a maleic anhydride-modified olefinically unsaturated elastomeric material to obtain a mixture (1), that the original bitumen and the original elastomeric material is mixed together to form a mixture which is then modified with maleic anhydride to obtain a modified product (2) and that the mixture (1) or modified product (2) so obtained is incorporated with aggregate. Further, it illustrates that bitumen is incorporated with small pieces of oil-extended styrene-butadiene rubber having a molecular weight of 400,000 or a toluene solution of styrene-butadiene rubber having a molecular weight of 200,000 to disperse the rubber in the bitumen thereby obtaining a dispersion which is then reacted with maleic anhydride.

In contrast, the asphalt composition of the present invention comprises a non-maleinated asphaltic material, a maleinated organic compound and aggregate.

The maleinated organic compound is excellently soluble in the asphaltic material and, therefore, the former may be mixed with the latter without dividing the former into small pieces or dissolving it to a solution in order to obtain a satisfactory mixture.

The maleinated organic compounds (B) used in the present invention are a reaction product (or adduct) of an organic compound with a maleic compound such as maleic anhydride and a derivative thereof, the reaction product having an average molecular weight of 200–10,000, preferably 200–5000. Maleinated organic compounds having a smaller molecular weight than the above are undesirable from the view-point of safety in that when they are used in the preparation of an asphaltic composition, the resulting composition will have a low ignition point; on the other hand, the use of maleinated organic compounds having a larger molecular weight than those used in the present invention will result in the production of asphalt compositions having a high softening point and, further, the use thereof makes it difficult to produce uniform asphalt compositions since the compounds have low compatibility with a mating asphaltic material whereby severe manufacturing conditions are required. It is the most preferable that the maleinated organic compounds have an average molecular weight of 250–3000.

The maleinated organic compounds may have an acid value of 10–250, preferably 60–120 and more preferably 75–120. The use of such compounds having an acid value lower than 10 will exhibit unsatisfactory effects on the resulting asphalt composition thereby undesirably requiring an excessive amount of the compounds to obtain a satisfactory composition, while those with an acid value higher than 250 have a high softening point whereby they undesirably decrease in compatibility with an asphaltic material.

The starting organic compounds to be maleinated for obtaining the maleinated organic compounds (B) according to this invention include polymers of a member selected from, or copolymers of at least two different monomers selected from, $C_4$–$C_5$ diolefins and halogen-substituted derivatives thereof (such as butadiene, chloroprene, isoprene and cyclopentadiene), $C_2$–$C_{15}$ straight-chain monoolefins (such as ethylene, propylene and butene), $C_8$–$C_9$ aromatic vinyl compounds (such as styrene, α-methylstyrene and vinyltoluene), $C_3$–$C_4$ vinyl compounds (such as acrylonitrile, vinyl acetate and methyl acrylate) and $C_6$–$C_7$ cyclomonoolefins (such as cyclohexene and methylcyclohexene). They also include $C_{18}$ unsaturated monocarboxylic acids (such as linoleic acid, linolenic acid and eleostearic acid), polymers of these monocarboxylic acids, drying oils of vegetable origin (such as linseed oil, tung oil, perilla oil and soybean oil), polymers of these vegetable oils, rosin, terpene and petroleum-derived waxes.

Of these starting organic compounds for obtaining the maleinated organic compounds, there may preferably be used at least one member selected from the group consisting of liquid polybutadiene, petroleum resins, drying oils of vegetable origin and polymers thereof, low molecular weight polymers of $C_2$–$C_{15}$ straight-chain monoolefins and petroleum-derived waxes.

The liquid polybutadienes used herein are compounds having an average molecular weight of 300–9000, preferably 500–5000 and more preferably 500–3000, prepared by the anionic or radical polymerization of butadiene using a known method. The liquid polybutadienes used may be mainly of either 1,2-linkage type or 1,4-linkage type with the polybutadienes mainly of 1,2-linkage type being more preferable. Those having terminal functional groups such as —OH, —COOH, —SH and —Br may also be used.

The petroleum resins used in this invention include aliphatic petroleum resins obtained by the polymerization of a fraction composed mainly of $C_5$ monoolefins and diolefins produced by the thermocracking of petroleum, aromatic petroleum resins obtained by the polymerization of a fraction composed mainly of $C_9$ aromatic vinyl compounds produced by the thermocracking of petroleum, alicyclic petroleum resins obtained by the nuclear hydrogenation of aromatic petroleum resins, and polymers of the $C_5$ and $C_6$ fractions in mixture and modifications of these polymers. In addition, said petroleum resins used in the present invention have an average molecular weight of 500–2000, preferably 700–1500, among which the aromatic petroleum resins are preferred.

The vegetable oils and polymers thereof used in this invention may be at least one member selected from the group consisting of linseed oil, tung oil, perilla oil, soybean oil and polymers thereof, and they have an average molecular weight of 250–5000, preferably 270–3000.

The low molecular weight polymers of the $C_2$–$C_{15}$ straight-chain monoolefins used in this invention may preferably be low molecular weight homopolymers and copolymers of the $C_2$–$C_4$ straight-chain monoolefins, among which are particularly preferred polyethylene having an average molecular weight of 300–10,000, preferably 300–3000, polypropylene having an average molecular weight of 200–5000, preferably 500–3500 and polybutene having an average molecular weight of 400–3000.

The petroleum-derived waxes used in this invention may preferably be paraffin waxes having a melting point of 30°–70° C. and average molecular weight of 300–500 and microcrystalline waxes having a melting point of 65°–95° C. and average molecular weight of 550–850. Mixtures of these petroleum-derived waxes with the aforesaid low molecular weight polymers of the straight-chain monoolefins may more preferably be used.

Of the maleinated organic compounds (B) used in this invention, the most preferable are those obtained by maleinating at least one member selected from the group consisting of liquid polybutadienes having an average molecular weight of 500–3000, vegetable oils (such as linseed oil, tung oil and perilla oil) and polymers thereof, and polyethylenes having an average molecular weight of 300–3000. These most preferable maleinated organic compounds have an average molecular weight of 250–3000 and acid value of 60–120.

The maleinized organic compounds (B) may be prepared by reacting 2–100 parts, preferably 3.5–50, by weight of a maleic compound such as maleic anhydride or a derivative thereof with 100 parts by weight of the aforesaid starting organic compound at a temperature of 100° to 300° C., preferably 100° to 200° C., and at least atmospheric pressure, preferably atmospheric to 30 Kg/cm² for 1 to 20 hours, preferably 2 to 10 hours. At this point, it is possible to use an acid, a peroxide or the like as a catalyst and it is also possible to use an inhibitor such as an anti-gelling agent as required. In this case, the reaction may be effected until the maleic anhydride has been completely reacted; if the reaction mixture contains the unreacted or decomposed maleic anhydride as impurities, it may also be used after or without removal of the impurities.

The asphaltic material mentioned here means asphalt or petroleum tar which is generally known for road paving application. This is to say, the word "asphalt" means natural asphalt or petroleum asphalt. The natural asphalt includes, for example, asphaltite such as gilsonite, grahamite and glance pitch; lake asphalt such as trinidad asphalt; and rock asphalt. The petroleum asphalt that may be used includes straight asphalt obtained by distillation of a crude oil, blown asphalt produced by blowing an oxygen-containing gas into straight asphalt in the presence or absence of a catalyst, solvent-extracted asphalt yielded when the asphaltic material is separated from the petroleum fraction containing it by the use of propane or other solvents, and cutback asphalt which is a mixture of straight asphalt and a volatile petroleum. The petroleum tar that may be used includes coal tar obtained by dry distillation of coal, oil gas tar obtained as a by-product when gases are produced from petroleum fractions, such tar in refined form, cutback tar obtained by incorporating a volatile petroleum fraction into such tar, and a tar pitch which is obtained as the residue by removing the volatile fraction from such tar. Any of these kinds of asphalt may be used singly or jointly. The asphaltic material that may preferably be used in this invention is asphalt. This is because coal tar is generally more sensitive to a change of temperature than asphalt and also because the amount of benzo(a)pyrene contained in asphalt is much smaller than that in coal tar. The most preferable asphaltic material in this invention is straight asphalt, particularly that having a penetration of 20–300 and a softening point of not higher than 90° C.

The aggregate (C) used in this invention is a natural or artificial one which is widely used. The natural aggregate includes macadam obtained by crushing various rocks such as basalt, andesite, lime stone, sandstone, andalusite and emery; gravel such as river gravel or mountain gravel; and sand such as river sand, sea sand, mountain sand, silica sand or coral sand. The artificial aggregate includes slug, calcined beauxite, corundum, Alundum, artificial light-weight aggregate, plastics or debris thereof.

The stripping-resistant asphalt composition of this invention comprises, by weight, (A) 100 parts of an asphaltic material, (B) 0.1–20 parts, preferably 0.1–10 parts, of a maleinated organic compound and (C) 500–4000 parts, preferably 600–3000 parts, of aggregate.

The use of the maleinated organic compound in an amount of less than 0.1 part by weight will result in the production of an asphalt composition having unsatisfactory stripping resistance, while the use thereof in an amount of more than 20 parts by weight will not further improve the resulting composition in stripping resistance, this being economically undesirable. If the amount of aggregate used is smaller than said range then the resulting asphalt composition will not have satisfactory strength, while if the amount thereof used is larger than said range then the resulting asphalt composition will be such that a uniform and satisfactory bond strength is not effected between the asphaltic material and the aggregate.

The stripping-resistant asphalt composition of this invention may preferably be prepared either by blending a mixture of the asphaltic material (A) and maleinated organic compound (B) with the aggregate (C) or by blending these components (A), (B) and (C) together at the same time. These blending operations are performed at 60°–240° C., preferably 100°–210° C. and more preferably 120°–200° C. At this time, it is not particularly required that the maleinated organic compound be crushed into pieces or dissolved into a solution.

This invention will be better understood by the following Preparations of the maleinated organic compounds, Examples and Comparative examples wherein all parts are by weight unless otherwise specified.

PREPARATIONS 1–7 OF MALEINATED ORGANIC COMPOUNDS AND COMPARATIVE EXAMPLES 1–2

Maleinated liquid polybutadiene (B-1)

One hundred (100) parts of liquid polybutadiene (average molecular weight, 10000), 16.3 parts of maleic anhydride and 0.1 part of an anti-gelling agent were reacted together at 195° C. under atmospheric pressure for 5.5 hours to obtain a maleinated product (B-1) having an average molecular weight of 1150 and acid value of 80.

Maleinated liquid polybutadiene (B-2)

One hundred (100) parts of liquid polybutadiene (average molecular weight, 2000), 3.6 parts of maleic anhydride and 0.1 part of an anti-gelling agent were reacted together at 195° C. under atmospheric pressure for 5.5 hours to obtain a maleinated product (B-2) having an average molecular weight of 2100 and acid value of 20.

Maleinated liquid polybutadiene (B-3)

One hundred (100) parts of liquid polybutadiene (average molecular weight, 2000), 16.3 parts of maleic anhydride and 0.1 part of an anti-gelling agent were reacted together at 195° C. under atmospheric pressure for 5.5 hours to obtain a maleinated product (B-3) having an average molecular weight of 2350 and acid value of 80.

Maleinated liquid polybutadiene (B-4)

One hundred (100) parts of liquid polybutadiene (average molecular weight, 3000), 3.6 parts of maleic anhydride and 0.1 part of an anti-gelling agent were reacted together at 195° C. under atmospheric pressure for 5.5 hours to obtain a maleinated product (B-4) having an average molecular weight of 3100 and acid value of 20.

Maleinated petroleum resin (B-5)

One hundred (100) parts of a copolymer (average molecular weight, 1300) of cyclopentadiene with vinyltoluene, and 5.5 parts of maleic anhydride were reacted together at 200° C. under atmospheric pressure for 6 hours to obtain a maleinated product (B-5) having an average molecular weight of 1400 and acid value of 30.

Maleinated polymerized linseed oil (B-6)

One hundred (100) parts of polymerized linseed oil (linseed oil No. 3), 16.5 parts of maleic anhydride were reacted together at 180° C. under atmospheric pressure for 5 hours to obtain a maleinated product (B-6) having an average molecular weight of 2000 and acid value of 81.

Maleinated low molecular weight polyethylene (B-7)

One hundred (100) parts of polyethylene (average molecular weight, 460) and 20 parts of maleic anhydride were reacted together at 180° C. under atmospheric pressure for 8 hours to obtain a maleinated product (B-7) having an average molecular weight of 600 and acid value of 120.

MISCIBILITY OF MALEINATED ORGANIC COMPOUND WITH ASPHALTIC MATERIAL

Each of the maleinated products (B-1) to (B-7) was blended with 80/100 straight asphalt in a ratio by weight of 5:100 at an elevated temperature to test the maleinated product and asphalt for their mutual miscibility with the result being shown in the following Table 1.

For comparison, each of maleinated styrenebutadiene rubber and maleinated ethylene-propylene copolymer was blended with the same asphalt under the same conditions as above to test the two materials for their mutual miscibility.

TABLE 1

|  | Maleinated organic compound | Miscibility with asphaltic material |
| --- | --- | --- |
| Preparation 1 | Maleinated liquid polybutadiene (B-1) (Av. mol. wt., 1150) | Perfectly compatible with each other at 120° C. thereby to obtain a uniform mixture. |
| Preparation 2 | Maleinated liquid polybutadiene (B-2) (Av. mol. wt., 2100) | Perfectly compatible with each other at 120° C. thereby to obtain a uniform mixture. |
| Preparation 3 | Maleinated liquid polybutadiene (B-3) (Av. mol. wt., 2350) | Perfectly compatible with each other at 120° C. thereby to obtain a uniform mixture. |
| Preparation 4 | Maleinated liquid polybutadiene (B-4) (Av. mol. wt., 3100) | Perfectly compatible with each other at 120° C. thereby to obtain a uniform mixture. |
| Preparation 5 | Maleinated liquid polybutadiene (B-5) (Av. mol. wt., 1400) | Perfectly compatible with each other at 170° C. thereby to obtain a uniform mixture. |
| Preparation 6 | Maleinated liquid polybutadiene (B-6) (Av. mol. wt., 2000) | Perfectly compatible with each other at 120° C. thereby to obtain a uniform mixture. |
| Preparation 7 | Maleinated liquid polybutadiene (B-7) (Av. mol. wt., 600) | Perfectly compatible with each other at 120° C. thereby to obtain a uniform mixture. |
| Comparative example 1 | Maleinated styrene . butadiene rubber (Av. mol. wt., 200,000) | Not smoothly compatible with each other at 170° C. |
| Comparative example 2 | Maleinated ethylene . propylene copolymer (Av. mol. wt., 100,000) | Not smoothly compatible with each other at 170° C. |

As is seen from Table 1 the maleinated organic compounds having a molecular weight of 10,000 or less used in this invention are smoothly compatible with 80/100 straight asphalt even at lower than 180° C. and, thus, they exhibit very excellent miscibility with the asphalt at the time of manufacture of a maleinated compound-asphalt mixture (hereinafter referred to simply as "asphalt mixture"). On the other hand, the maleinated organic compounds having the high molecular weight as shown in Comparative examples 1 and 2 do not produce uniform mixtures when blended with the 80/100 straight asphalt and, thus, it is required to cut the asphalt into pieces or dissolve it into a solution prior to blending in order to obtain uniform asphalt mixtures.

EXAMPLES 1–16 AND COMPARATIVE EXAMPLES 3–9

In these Examples, there were prepared asphalt compositions using the maleinated products (B-1) to (B-7) obtained in said Preparations 1–7. The asphalt compositions so prepared were tested for their stripping resistance. In each of Comparative examples 3–9, the same procedure as in the Examples was followed except that a non-maleinated organic compound was substituted for the maleinated organic compound, thereby to obtain an asphalt composition which was then tested for stripping resistance. The results are shown in Table 2. The process for the manufacture of asphalt compositions and the test for stripping resistance are as follows.

PROCESS FOR MANUFACTURING ASPHALT COMPOSITIONS

One hundred (100) parts of the 80/100 straight asphalt were blended with each of the maleinated or non-maleinated organic compounds in the specified ratio at 120° C. (170° C. for the petroleum resins and the maleinated derivatives thereof) for 5 minutes to prepare a mixture. Each of the mixtures so prepared was blended with, as the aggregate, rigid sandstone (consisting mainly of 73 wt.% $SiO_2$ and 12 wt.% $Al_2O_3$) having a particle size of 10–13 mm to obtain an asphalt composition. The asphalt compositions so obtained were tested for their stripping resistance.

TEST FOR STRIPPING RESISTANCE

In accordance with "Test of asphaltic coatings for peeling resistance" described on page 55 of "Manual for asphalt pavement" published by Japan Road Association, the test for stripping resistance was made as follows.

The aforesaid aggregate was washed with city water to remove fine powdery impurities therefrom, dried at 105°–110° C. for 12 hours and then heated to 145° C. for one hour. One hundred (100) grams of the aggregate so heated were blended with 5.5 g of each of the aforesaid asphalt mixtures previously heated to 145° C. for 15 minutes, and the blending was effected for 2 minutes to coat the particulate aggregate with the asphalt mixture thereby obtaining asphalt compositions. The asphalt compositions so obtained were each spread on a glass plate, 15 cm×15 cm, cooled to room temperature and immersed in a thermostatic water tank at 80° C. for 30 minutes. Thereafter, the glass plates with the asphalt composition thereon were each withdrawn from the water tank and visually measured for the area of asphalt coating peeled off (or stripped off) the aggregate whereby the peeling resistance was evaluated. The results are indicated in the following Table.

TABLE

| Evaluation | Area of asphalt coating stripped off (%) | Stripping resistance |
| --- | --- | --- |
| ⊚ | Less than 3 | Excellent |
| ○ | 3–10 | Satisfactory |
| Δ | 10–30 | Partly peeled off |
| X | More than 30 | Considerably peeled off |

As is clear from the following Table 2 indicating a comparison of the test results of Examples 1–9 with those of Comparative examples 4–6, the asphalt compositions containing the maleinated liquid polybutadiene have very excellent peeling resistance as compared with those containing non-maleinated liquid polybutadiene. This effect of maleination (or maleinisation) is true with petroleum resins, polymerized linseed oils and low molecular-weight polyethylenes. It is clear that the use of the maleinated organic compounds having an acid value of 75 or more will result in the production of asphalt compositions having particularly excellent stripping resistance.

TABLE 2

| | Asphalt Composition (Parts by weight) | | | Stripping resistance |
| --- | --- | --- | --- | --- |
| | Asphaltic material | Maleinated or Non-maleinated organic compound | Aggregate | |
| Example 1 | 80/100 straight asphalt (100) | Maleinated liquid polybutadiene (B-1) (1) | Rigid sandstone (1830) | |
| 2 | 80/100 straight asphalt (100) | Maleinated liquid polybutadiene (B-1) (0.5) | Rigid sandstone (1830) | |
| 3 | 80/100 straight asphalt (100) | Maleinated liquid polybutadiene (B-2) (5) | Rigid sandstone (1830) | Δ |
| 4 | 80/100 straight asphalt (100) | Maleinated liquid polybutadiene (B-3) (1) | Rigid sandstone (1830) | |
| 5 | 80/100 straight asphalt (100) | Maleinated liquid polybutadiene (B-3) (0.5) | Rigid sandstone (1830) | |
| 6 | 80/100 straight asphalt (100) | Maleinated liquid polybutadiene (B-3) (0.25) | Rigid sandstone (1830) | |
| 7 | 80/100 straight asphalt (100) | Maleinated liquid polybutadiene (B-4) (5) | Rigid sandstone (1830) | |
| 8 | 80/100 straight asphalt (100) | Maleinated liquid polybutadiene (B-4) (2.5) | Rigid sandstone (1830) | |
| 9 | 80/100 straight asphalt (100) | Maleinated liquid polybutadiene (B-4) (1) | Rigid sandstone (1830) | Δ |
| 10 | 80/100 straight asphalt (100) | Maleinated petroleum resin (B-5) (5) | Rigid sandstone | |

TABLE 2-continued

| | | Asphalt Composition (Parts by weight) | | |
|---|---|---|---|---|
| | Asphaltic material | Maleinated or Non-maleinated organic compound | Aggregate | Stripping resistance |
| 11 | 80/100 straight asphalt (100) | Maleinated petroleum resin (B-5) (1) | Rigid sandstone (1830) | |
| 12 | 80/100 straight asphalt (100) | Maleinated petroleum resin (B-5) (0.5) | Rigid sandstone (1830) | Δ |
| 13 | 80/100 straight asphalt (100) | Maleinated polymerized linseed oil (B-6) (1) | Rigid sandstone (1830) | |
| 14 | 80/100 straight asphalt (100) | Maleinated polymerized linseed oil (B-6) (0.5) | Rigid sandstone (1830) | |
| 15 | 80/100 straight asphalt (100) | Maleinated low molecular weight polyethylene (B-7) (1) | Rigid sandstone (1830) | |
| 16 | 80/100 straight asphalt (100) | Maleinated low molecular weight polyethylene (B-7) (0.5) | Rigid sandstone (1830) | |
| Comparative example 3 | 80/100 straight asphalt (100) | | Rigid sandstone (1800) | X |
| 4 | 80/100 straight asphalt (100) | Liquid polybutadiene having an av. mol. wt. of 1100 (1) | Rigid sandstone (1800) | X |
| 5 | 80/100 straight asphalt (100) | Liquid polybutadiene having an av. mol. wt. of 1910 (5) | Rigid sandstone (1800) | X |
| 6 | 80/100 straight asphalt (100) | Liquid polybutadiene having an av. mol. wt. of 1910 (1) | Rigid sandstone (1800) | X |
| 7 | 80/100 straight asphalt (100) | Petroleum resin having an av. mol. wt. of 1500 (5) | Rigid sandstone (1800) | X |
| 8 | 80/100 straight asphalt (100) | Linseed oil No. 4 (1) | Rigid sandstone (1800) | X |
| 9 | 80/100 straight asphalt (100) | Polyethylene having an av. mol. wt. of 500 (1) | Rigid sandstone (1800) | X |

EXAMPLES 17–18 AND COMPARATIVE EXAMPLES 10–11

Various asphalt compositions prepared as in Table 3 were subjected to immersion Marshall test for stripping resistance and durability. The asphalt compositions were prepared and the immersion Marshall test made as follows.

Preparation of Asphalt Compositions

The 80/100 straight asphalt was blended with each of the maleinated organic compounds (B-1), (B-7) and the commercially available anti-stripping agent (stearyl propylenediamine), and the whole was blended at 120° C. for 5 minutes thereby forming an asphalt mixture. The asphalt mixtures so formed were each incorporated

TABLE 3

| | Asphalt composition (Parts by weight) | | | Marshall test | | Immersion Marshall test | | Residual |
|---|---|---|---|---|---|---|---|---|
| | Asphaltic material | Maleinated organic compound etc. | Aggregate | Maximum load (Kg) | Flow value (0.1mm) | Maximum load (Kg) | Flow value (0.1mm) | maximum load (%) |
| Example 17 | 80/100 straight asphalt (100) | Maleinated low molecular weight polyethylene (B-7) (1) | As indicated in Table 4 (2143) | 540 | 33 | 540 | 34 | 100 |
| Example 18 | 80/100 straight asphalt (100) | Maleinated liquid polybutadiene (B-1) (1) | As indicated in Table 4 (2143) | 500 | 32 | 480 | 33 | 96 |
| Comparative example 10 | 80/100 straight asphalt (100) | — | As indicated in Table 4 (2122) | 560 | 30 | 360 | 35 | 65 |
| Comparative example 11 | 80/100 straight asphalt (100) | Commercially available anti-stripping agent (1) | As indicated in Table 4 (2143) | 560 | 31 | 460 | 30 | 83 |

Note:
The above Marshall test was made in accordance with ASTM D 1559.

with the aggregate having the composition shown in Table 4 to obtain an asphalt composition which was then subjected to immersion Marshall test.

TABLE 4

| Composition of aggregate | | |
|---|---|---|
| Components | (Particle size) | Wt. % |
| No. 5 rigid sandstone | 25–13 mm | 20 |
| No. 6 rigid sandstone | 13–5 mm | 35 |
| No. 7 rigid sandstone | 5–2.5 mm | 32 |
| Fine sand | 25–0.074 mm | 10 |
| Filler (CaCO$_3$ powder) | 0.3–0.074 mm | 3 |

Immersion Marshall Test for Maximum Load

This test was made in accordance with the method described on page 265 of "Test on Asphalt Pavement" of "Manual for Construction Engineering" published in 1971.

Using the aggregate shown in Table 4 and in accordance with the procedure described on page 160 of "Manual for Asphalt Pavement" published by Japan Road Association in 1975, samples for the Marshall maximum load test were prepared under the operational conditions shown in Table 5.

TABLE 5

| Operational conditions for preparing samples for Marshall maximum load test | |
|---|---|
| Mixing temperature | 150°–155° C. |
| Compacting temperature | 135°–140° C. |
| No. of times of compacting | 50 times at each side |
| Amount of asphalt used | 4.5 wt. % |

The samples so prepared were tested for Marshall maximum load, after which they were immersed in a thermostatic water tank at 60° C. for 48 hours and further tested for immersion Marshall maximum load. From the results of these two maximum load tests, the residual maximum load was calculated using the following formula:

$$\text{Residual maximum load (\%)} = \frac{\text{Immersion Marshall maximum load (Kg)}}{\text{Marshall maximum load (Kg)}} \times 10\%$$

From Table 3 it is apparent that when used in paving, the asphalt compositions of Examples 17–18 will have high residual maximum load and satisfactory stripping resistance without being substantially influenced by moisture and will further have excellent durability as an asphalt pavement; on the other hand, when used in paving, the asphalt composition of Comparative example 10 composed only of the 80/100 asphalt and aggregate will have low residual maximum load. When used in paving, the asphalt composition of Comparative example 11 containing the commercially available anti-stripping agent will have somewhat improved, but still unsatisfactory, residual maximum load.

What is claimed is:
1. A stripping-resistant asphalt composition comprising
(A) 100 parts by weight of a nonmaleinated asphaltic material selected from the group consisting of a non-maleinated asphalt and tar,
(b) 0.1–20 parts by weight of a maleinated organic compound having an average molecular weight of 200–10,000 and an acid value of 10–250, the maleinated organic compound being a reaction product of maleic anhydride with at least one member selected from the group consisting of liquid polybutadienes, petroleum resins, drying oils of vegetable origin and polymers thereof, low molecular-weight polymers of $C_2$–$C_{15}$ straight-chain monoolefins and petroleum-derived waxes, and
(C) 500–4000 parts by weight of aggregate.

* * * * *